United States Patent [19]

Klüting et al.

[11] 4,128,225

[45] Dec. 5, 1978

[54] CONSTANT TORQUE ADJUSTABLE SEAT

[75] Inventors: Bernd Klüting, Radevormwald; Hans W. Voss, Wuppertal, both of Fed. Rep. of Germany

[73] Assignee: Firma Fritz Keiper KG, Remscheid, Fed. Rep. of Germany

[21] Appl. No.: 801,740

[22] Filed: May 31, 1977

[30] Foreign Application Priority Data

Jun. 12, 1976 [DE] Fed. Rep. of Germany ....... 2626442

[51] Int. Cl.² ............................................. F16M 13/00
[52] U.S. Cl. ....................................... 248/421; 248/422
[58] Field of Search ........ 248/157, 421, 422, 393–397; 297/325–329, 345–348; 254/95, 96, 97

[56] References Cited

U.S. PATENT DOCUMENTS

| 520,947 | 6/1894 | Browne | 297/347 X |
|---|---|---|---|
| 1,278,730 | 9/1918 | Oliver | 248/422 X |
| 2,170,923 | 8/1939 | Jacobs | 248/394 |
| 2,321,716 | 6/1943 | Wahlberg | 248/395 |
| 2,614,608 | 10/1952 | Ardussi | 297/346 X |
| 2,655,862 | 10/1953 | Mitnick | 254/95 X |
| 3,912,215 | 10/1975 | Reinmoller et al. | 248/421 |

FOREIGN PATENT DOCUMENTS

| 377844 | 6/1923 | Fed. Rep. of Germany | 297/327 |
|---|---|---|---|
| 2032252 | 1/1972 | Fed. Rep. of Germany | 248/394 |
| 1167833 | 12/1958 | France | 248/421 |
| 554671 | 7/1943 | United Kingdom | 248/421 |
| 699612 | 11/1953 | United Kingdom | 297/346 |
| 1165118 | 9/1969 | United Kingdom | 297/326 |
| 159414 | 6/1964 | U.S.S.R. | 248/421 |

*Primary Examiner*—Lawrence J. Staab
*Attorney, Agent, or Firm*—Michael J. Striker

[57] ABSTRACT

An adjustable automobile seat includes a base member, a carrier member for supporting a load, and support legs intermediate the base and carrier members. An actuating handle vertically moves the carrier member relative to the base member to thereby adjust the position of the seat. Eccentric gears are provided intermediate the base and carrier members for maintaining the torque which is necessary for turning the handle substantially constant during the movement of the carrier member.

8 Claims, 6 Drawing Figures

CONSTANT TORQUE ADJUSTABLE SEAT

BACKGROUND OF THE INVENTION

The present invention generally relates to load-lifting apparatuses and, more particularly, to vertically-adjustable car seats.

Car seats with vertical-adjustment capability are known in the automobile industry. The seat portion is connected to a carrier member which is in turn pivotally connected to a base member by support legs. An actuating handle is operative for moving the carrier member between lowered and raised positions relative to the base member.

It has been proposed to use one pair of support legs at the front of the seat and another pair of support legs at the rear. Alternatively, guide tracks have been used at the rear of the seat. It has further been proposed to use gears or gear segments intermediate the base and carrier members for improving force transmission. A rotary gear has been turnably mounted on the frame of the seat, and a cooperating gear has been mounted on the support legs for meshing engagement with the rotary gear. Alternatively, the rotary gear has been mounted on the support legs and a stationary meshing gear has been mounted on the seat frame.

All of the known prior-art proposals for adjusting the position of car seats are characterized in that the angular distance through which the support legs are moved corresponds to the angular distance through which the rotary gear is moved. The known proposals thus have the disadvantage that the torque necessary for turning the actuating handle is relatively high when the carrier member is closest to the base member, that is when the carrier member is in its lowered position, and further that the torque is relatively low when the carrier member is furthest from the base member, that is when the carrier member is in its raised position. Therefore, when the actuating handle is turned, the magnitude of the turning torque is continuously varying, and the torque required at any particular time will depend upon the relative position between the carrier and base members. This changing torque characteristic is highly disadvantageous for a user.

SUMMARY OF THE INVENTION

Accordingly, it is the general object of the present invention to overcome the drawbacks of the prior art.

An additional object of the present invention is to maintain the turning torque substantially constant during operation of the actuating handle.

Still another object of the present invention is to provide a long-lasting and maintenance-free load lifting arrangement which is particularly well suited for adjusting the height position of automobile seats.

In keeping with these objects and others which will become apparent hereinafter, one feature of the invention resides, briefly stated, in an arrangement for lifting a load, particularly an adjustable seat arrangement, which comprises a base member having a curved bearing surface, and a carrier member which is adapted to support a load. Actuating means includes an actuator which is turnable about a pivot point that is movable in a curved path between first and second end limiting positions. The curved path is spaced from the bearing surface such that the pivot point at the first position defines a straight line of predetermined length with the bearing surface, and the pivot point at the second position defines with the bearing surface a straight line of length longer than the aforementioned predetermined length. The actuating means is operative for moving the carrier member relative to the base member between a lowered position in which the load has a weight component of predetermined magnitude tangentially of the curved path and a raised position in which the load has a weight component tangentially of the curved path which has a magnitude less than the predetermined magnitude.

In accordance with the invention, the arrangement includes torque-maintaining means operative for orbiting the pivot point along the curved path between the first and second positions as the carrier member is respectively moved from its lowered towards its raised position. The pivot point is orbited such that each successive straight line defined by each instantaneous pivot point relative to the bearing surface has a length greater than a preceding straight line in substantially inverse proportion to the change in magnitude of the tangential weight component of the load. Therefore, the moment of force necessary for turning the actuator to thereby lift the load remains substantially constant during the movement of the carrier member.

In accordance with the invention, the torque required to turn the actuator handle is independent of the angle of inclination of the support legs which interconnect the base and carrier members or the relative position between the former and the latter. The aforementioned increasing straight line distance compensates for the decreasing weight component which acts normally of this straight line. Thus, the substantially constant torque characteristic at all relative positions of base and carrier members results in easier handling by a user.

In a preferred embodiment of the invention, the torque-maintaining means comprises a rotary, part-elliptically-shaped element which engages and moves relative to a stationary part-elliptically-shaped element. In another preferred embodiment, the torque-maintaining means comprises a rotary circular gear which is eccentrically mounted relative to its center, and a stationary part-elliptically-shaped element which is engaged by the rotary circular gear. Other configurations are likewise possible which are operative to modify the prior-art variable torque characteristic to a constant torque characteristic.

The novel features which are considered as characteristic for the invention are set forth in particular in the appended claims. The invention itself, however, both as to its construction and its method of operation, together with additional objects and advantages thereof, will be best understood from the foregoing description of specific embodiments when read in connection with the accompanying drawings.

DESCRIPTION OF THE PREFERRED EMBODIMENTS

Figure 1:
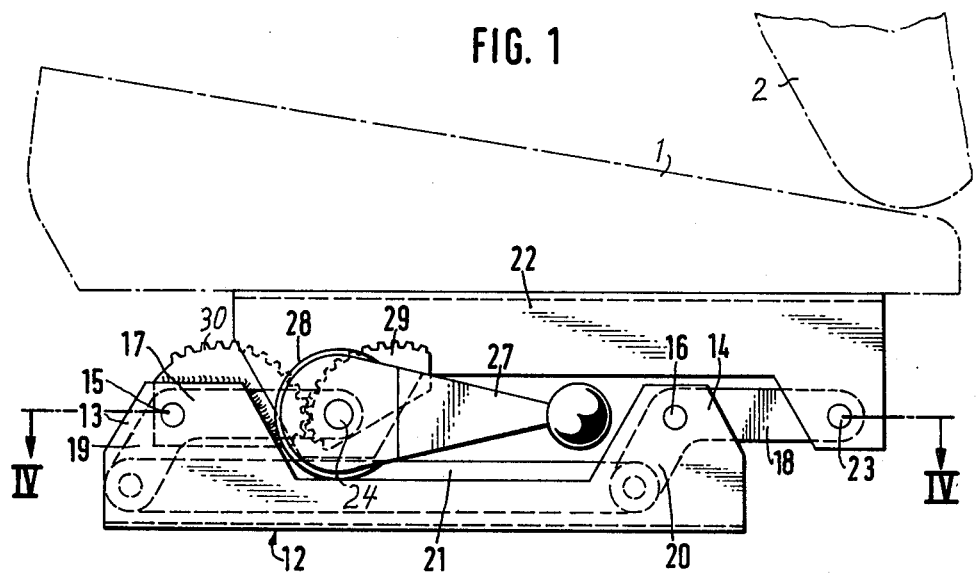
FIG. 1 is a partially schematic side view of one embodiment of the load lifting arrangement in fully lowered position in accordance with the present invention.

FIGS. 1-4 illustrate one embodiment of a load lifting arrangement which is particularly and advantageously well suited to be used as a vertically adjustable seat in automobiles or the like. For exemplary purposes only, reference numerals 1 and 2 respectively identify seat and backrest portions of an adjustable seat in FIGS. 1 and 2; and reference numerals 10 and 11 in FIGS. 3 and 4 respectively identify the floor of a car and the guide rails upon which the seat is to be adjustably mounted for longitudinal movement. Although other loads may be moved in accordance with the invention, the invention will be described in the context of a vertically-adjustable seat for ease of description.

A pair of substantially parallel base members 12 are arranged mirror-symmetrically relative to each other (see FIG. 3) and are mounted on guide rails 11 at the base 10 of a car for longitudinal slidable and arrestable movement. Each base member 12 has an L-shaped cross-section and front and rear mounting flanges 13 and 14 respectively, both of which extend in upward direction.

One pair of generally L-shaped support brackets or front legs 17 is pivotally mounted at pivot point 15 on front mounting flanges 13. Another pair of generally L-shaped support brackets or rear legs 18 is pivotally mounted at pivot point 16 on rear mounting flanges 14. Each leg 17, 18 has two angularly offset arms; and each shorter arm 19 of the respective front leg 17 and each shorter arm 20 of the respective rear leg 18 are connected together by a coupling rod 21 which is pivotally connected to both respective shorter arms 19 and 20 at their respective ends. Coupling rods 21 assure that both front and rear legs 17, 18 are pivoted simultaneously about their respective pivot points 15 and 16 in the vertical plane of FIG. 1 or 2.

A pair of load-supporting carrier members 22 is connected to the seat portion 1 and the carrier members 22 are pivotally connected to the front legs 17 and rear legs 18. Each carrier member 22 has an L-shaped cross-section (see FIG. 3), and a front mounting portion 22' and a rear mounting portion 22" which extend downwardly towards the base member 12.

Each longer arm 18' of each rear leg 18 is pivotally connected to the rear mounting portion 22' for rotation about a respective pivot point 23. Each longer arm 17' of each front leg 17 is pivotally connected to the front mounting portion 22' for rotation about a respective pivot point, i.e., pin 24 at one side of the seat and a coaxially arranged pin 25 at the other side of the seat (see FIG. 3).

Pivot pins 24, 25 have splined portions which are respectively tightly mounted in opposite ends of a hollow connecting tube 26 for rotation therewith. Actuating means or handle 27 is turnable through an angular distance as measured by the relative positions shown in FIGS. 1 and 2 about the pivot point 24, 25 and is connected to pin 25 so as to simultaneously turn the tube 26 and the pin 24 through a proportional angular distance.

A braking mechanism 28 is arranged intermediate the actuating handle 27 and the tube 26. A mechanism 28 transmits turning movement of the handle 27 to the tube 26, and also prevents such transmission of force when a predetermined angular distance has been exceeded. Such mechanisms are conventional and details thereof can be found by reference to German Pat. No. 975,780.

A pair of eccentric elements 29 is provided which are respectively tightly mounted on the splined pins 24 and 25 at opposite ends of the tube 26 for rotation with the handle 27 about the pivot point 24, 25. Each eccentric element 29 is shaped as a segment of an ellipse. The longitudinal axis, which interconnects the pivot pins 24 and 25 and which extends along the tube 26, extends through one of the foci of the ellipse.

Each eccentric element 29 has an outer curved bearing surface which may be smooth to resemble a cam or is provided with a set of teeth (as illustrated) to thereby resemble a gear.

Each base member 12 has an elliptically-shaped element 30 which has a curved bearing surface facing the bearing surface of the eccentric element 29. The bearing surface of the element 30 may likewise be smooth to resemble a cam or is also provided with a set of teeth (as illustrated) to thereby resemble a gear. The set of teeth on the element 30 meshes with the teeth provided on the element 29. Each element 30 is stationarily mounted by welding to the base member 12, whereas the element 29 is turnable about the pivot point 24, 25. The longitudinal axis of each elliptical element 30 extends in horizontal direction, and each pivot point 16 is located at a focus of the elliptically-shaped element 30.

In operation, as the handle 27 is turned, pivot pins 24 and 25 likewise turn and impart their rotary movement to the elements 29. Each bearing surface of a respective element 29 thereby engages and moves over the respective bearing surface of element 30. The described elliptical shape and orientation of elements 29 and 30 cause the pivot point 24, 25 to orbit in a curved path which is spaced from the outer bearing surface of the element 30. During this orbiting movement of the pivot point 24, 25, each carrier member 22 is moved upwardly from the fully lowered position shown in FIG. 1 to the raised position shown in FIG. 2.

It is noted that in FIG. 1 the straight line distance between the pivot point 24, 25 to the point of mutual engagement between the respective bearing surfaces of elements 29 and 30 has a predetermined length. It is further noted that FIG. 2 the straight line distance between pivot point 24, 25 to the point of mutual engagement between elements 29 and 30 has a length which is longer than the aforementioned predetermined length. In other words, as the pivot point 24, 25 is orbited in a curved path, the particular shape and orientation of the elements 29 and 30 cooperate such that each successive straight line defined by each instantaneous location of the pivot point in its path and the respectively associated instantaneous point of mutual interengagement has a length which is greater than a preceding straight line.

Referring to FIG. 1, it will be noted that the weight of the load is resolved into a single force component which acts downwardly in direction tangentially of the curved path of pivot point 24, 25. Now, referring to FIG. 2, it will be noted that the weight of the load may likewise be resolved but into two components, i.e., a tangential force component and a normal force component as considered with respect to the curved path of pivot point 24, 25. Upon comparing both tangential components, the magnitude of the weight component in the raised position is less than the magnitude of the weight component in the lowered position.

It is now believed to be evident how the torque or moment of force necessary for turning the actuating handle 27 remains substantially constant during the movement of the carrier member. Torque is a function of the aforementioned straight-line distance and of the tangential weight component which is directly normally of this straight-line distance. In accordance with the invention, the decrease in magnitude of the tangential weight component as the load is lifted upwardly is compensated by increasing the straight-line distance in any inversely proportional relationship.

Figure 2:
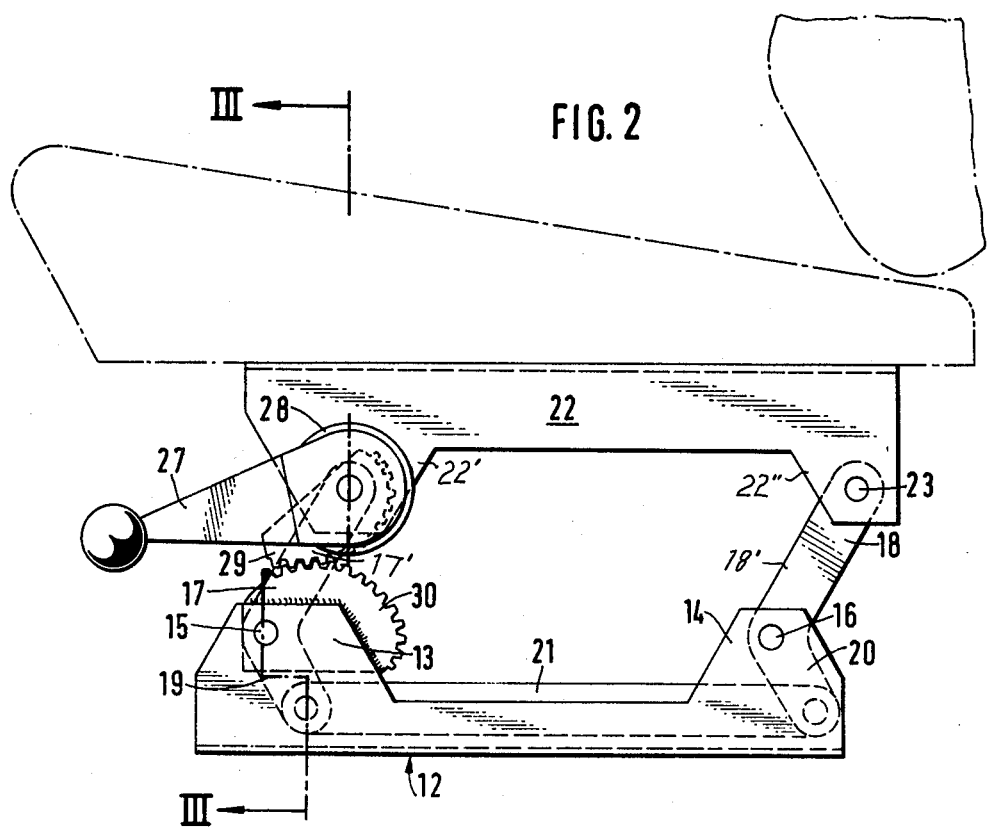
FIG. 2 is a partially schematic side view of the FIG. 1 embodiment of the load lifting arrangement in a raised position in accordance with the present invention.
Figure 3:
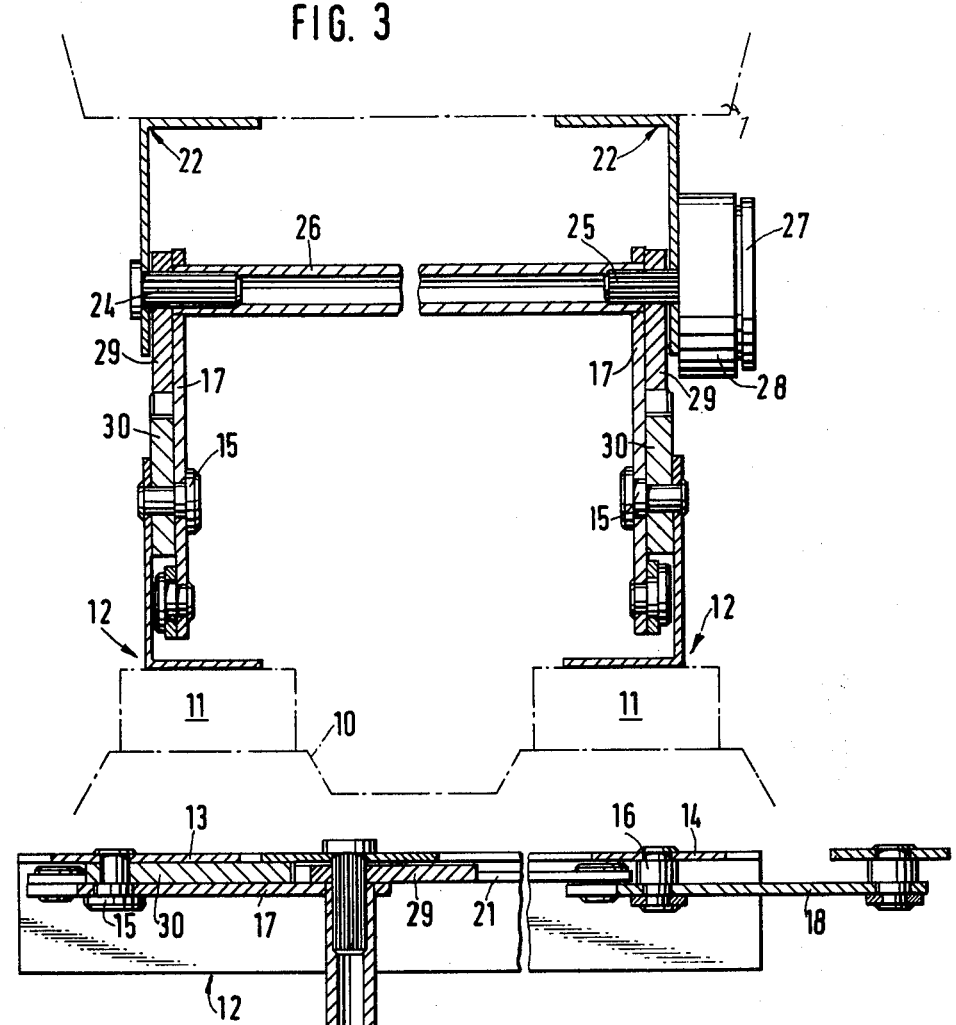
FIG. 3 is a partially schematic view in vertical section taken on line III—III of FIG. 2.
Figure 4:
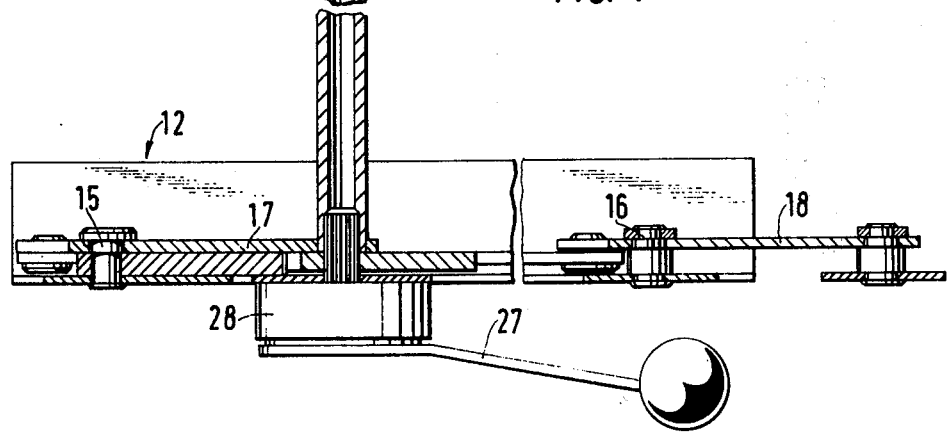
FIG. 4 is a partial view in horizontal section taken on line IV—IV of FIG. 1.
Figure 5:
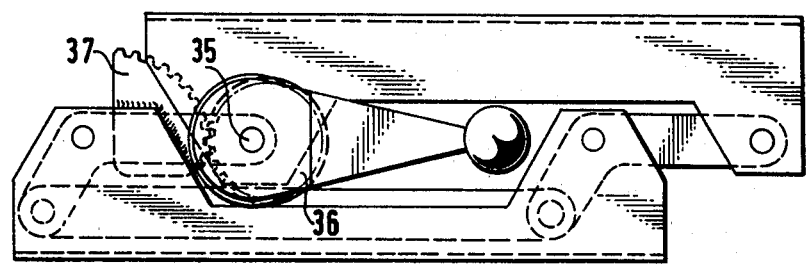
FIG. 5 is a view analogous to FIG. 1 showing another embodiment of the invention.
Figure 6:
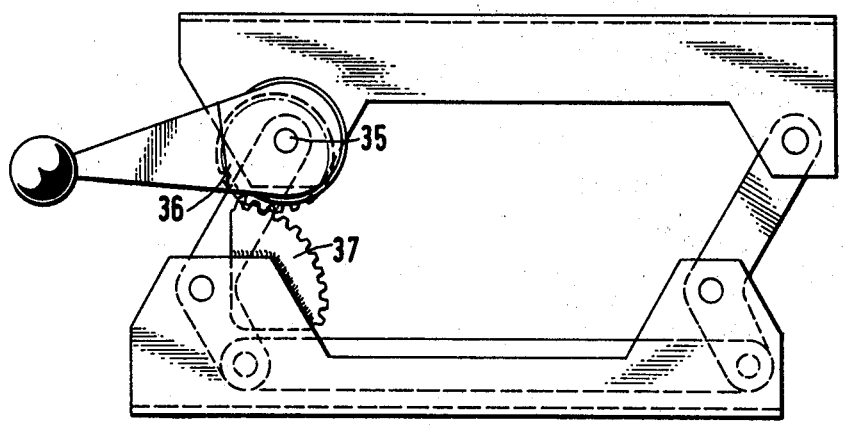
FIG. 6 is a view analogous to FIG. 2 showing the FIG. 5 embodiment of the invention.

FIGS. 5 and 6 show another embodiment and are respectively analogous to FIGS. 1 and 2. However, the rotary element 36 mounted on the carrier member is not an elliptically-shaped segment, but is instead a circular gear 36 which is mounted off-center relative to the carrier member at a pivot point 35. As shown in FIG. 5, the straight line distance between the pivot point 35 and the point of mutual interengagement with stationary part-elliptically-shaped member 37 is at a minimum, whereas in FIG. 6, the straight-line distance has a greater length. The cooperation between the stationary element 37 and the rotary element 36 achieves the same substantially constant torque characteristic as mentioned above in the description of the embodiment of FIGS. 1–4. Other configurations of torque-maintaining elements 29 and 30 are also possible.

It will be understood that each of the elements described above, or two or more together, may also find a useful application in other types of constructions differing from the types described above.

While the invention has been illustrated and described as embodied in a constant torque adjustable seat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for lifting a load, particularly an adjustable seat, comprising a base member having a curved bearing surface; a carrier member adapted to support a load; means for mounting said carrier member on said base member for movement between a lowered position and a raised position relative to said base member; actuating means including an actuator turnable about a pivot point which is movable in a curved path in a range between first and second end limiting positions and engaging said bearing surface at different engagement points throughout said range, said curved path being spaced from said bearing surface such that the distance from said pivot point to the respective engagement point has a predetermined length when said pivot point is at said first position and a length exceeding said predetermined length when said pivot point is at said second position said actuating means being operative for moving said carrier member relative to said base member between said lowered position in which the load has a weight component of predetermined magnitude tangentially of said curved path, and said raised position in which the load has a weight component tangentially of said curved path which has a magnitude less than said predetermined magnitude; and means for orbiting said pivot point along said path between said first and second positions as said carrier member is respectively moved from its lowered toward its raised position such that each successive distance between each instantaneous position of the pivot point and the respective engagement point has a length exceeding a preceding such distance in substantially inverse proportion to the change in magnitude of the tangential weight component of the load, so that the force necessary for turning said actuator to thereby lift the load remains substantially constant during the movement of the carrier member.

2. An arrangement as defined in claim 1; wherein said mounting means includes support legs interconnecting said base and carrier members, each support leg being pivotally connected to said base member and to said carrier member.

3. An arrangement as defined in claim 1, wherein said curved bearing surface has a first set of teeth, and wherein said actuating element includes an eccentric portion having an outer toothed surface, said toothed surface having a second set of teeth which meshes with said first set.

4. An arrangement as defined in claim 1, wherein said base member includes a stationary element fixedly mounted thereon, and wherein said curved bearing surface is located at the periphery of said stationary element.

5. An arrangement as defined in claim 1, wherein said actuating element includes an eccentric portion having an outer bearing surface which engages said bearing surface of said bearing element.

6. An arrangement as defined in claim 5, wherein said eccentric portion is generally elliptically-shaped, and wherein said pivot axis is located substantially at one of the foci of the elliptically-shaped portion.

7. An arrangement as defined in claim 5, wherein said eccentric portion is generally circularly-shaped, and wherein said pivot axis is located off-center relative to the center of the circularly-shaped portion.

8. An arrangement for lifting a load, particularly an adjustable seat, comprising a base member; a carrier member adapted to support the load; means for so mounting said carrier member on said base member for movement relative thereto along a curved path through a plurality of positions between a lowered and a raised position that a force component which tends to move said carrier member toward said lowered position and acts tangentially of said path diminishes as said carrier member approaches said raised position; and means for counteracting said force component with the exertion of a substantially constant force and for moving said carrier member along said path, including a bearing element rigid with one of said members and having a curved bearing surface, and an actuating element mounted on the other of said members for pivoting relative thereto about a pivot axis and engaging said bearing surface in each of said positions of said carrier member at a different engaging location the distance of which from said pivot axis varies from one of said positions of said carrier member to another substantially in an inverse proportion to the magnitude of a torque about said pivot axis to which said force component subjects said actuating element, whereby the magnitude of the force to be applied to said actuating element to counteract said torque is substantially the same in each of said positions of said carrier member.

* * * * *